United States Patent [19]

Atalla

[11] 4,140,272
[45] Feb. 20, 1979

[54] OPTICAL CARD, SYSTEM AND METHOD FOR SECURING PERSONAL IDENTIFICATION DATA

[75] Inventor: Martin M. Atalla, Portola Valley, Calif.

[73] Assignee: Atalla Technovations, Sunnyvale, Calif.

[21] Appl. No.: 838,891

[22] Filed: Oct. 3, 1977

Related U.S. Application Data

[63] Continuation-in-part of Ser. No. 824,260, Aug. 15, 1977, which is a continuation-in-part of Ser. No. 813,882, Jul. 8, 1977.

[51] Int. Cl.² .......................... G06K 5/00; G06K 7/14
[52] U.S. Cl. ...................................... 235/380; 235/460
[58] Field of Search .............................. 235/380, 375; 340/149 A, 149 R

[56] References Cited

U.S. PATENT DOCUMENTS 3,740,530  6/1973  Hoffer et al. ........................ 235/380
3,846,622  11/1974  Meyer ............................... 340/149 A
4,013,894  3/1977  Foote et al. .......................... 235/380

Primary Examiner—Daryl W. Cook
Attorney, Agent, or Firm—A. C. Smith

[57] ABSTRACT

A card having randomly-oriented optical ports and a system having a card reader for reading the card and having a keyboard for entering secret user-identification data are disclosed for securing the user-identification data entered into the system. The system includes a logic unit for controlling the keyboard, and for applying data to the card via the card reader. The system may also include a physical data collector or transducer for collecting fingerprint or voice-print data, or the like, from a user and for applying such data in digital form to the card via the logic unit and the card reader. The card operates in conjunction with the logic unit of the system to transform the applied data and to improve the security of said data. A method of fabricating the card and a method of securing entered data using the card are also disclosed.

8 Claims, 6 Drawing Figures

OPTICAL CARD, SYSTEM AND METHOD FOR SECURING PERSONAL IDENTIFICATION DATA

CROSS-REFERENCE TO RELATED APPLICATIONS

This is a continuation-in-part application of U.S. Patent Application Ser. No. 824,260, filed Aug. 15, 1977, entitled CARD, SYSTEM AND METHOD FOR SECURING PERSONAL IDENTIFICATION DATA, which is a continuation-in-part application of U.S. Patent Application Ser. No. 813,882, filed on July 8, 1977, entitled CARD, SYSTEM AND METHOD FOR SECURING USER IDENTIFICATION DATA.

BACKGROUND OF THE INVENTION

Many types of transaction cards (account cards, identification cards and the like) have been used by individuals to gain access to account files in a bank or similar institution to gain access to secure areas, or to initiate some similar transaction enabling them to access otherwise restricted information stored in the institution. Not infrequently, the person using the card is not the person to whom the card was issued (i.e., not an authorized user of the card), but a person who has found, stolen, or manufactured (perhaps duplicated) the card with the intent to use it illicitly.

Heretofore, relevant information such as account number or code, employee number, social security number and the like, has been included on the card such as by embossing, magnetically or optically encoding on the card, or the like. A card of this type, and a system which utilizes such a card, are shown, for example, in U.S. Pat. No. 3,862,716 entitled "Automatic Cash Dispenser and System and Method Therefor", issued Jan. 28, 1975 to Robert Black and Christopher Hall.

Because of the dire consequences usually occasioned by the breach of the security of such a card-utilizing system by an unauthorized card user, a more secure card and system which would make the probability of a breach more remote would be highly desirable. A card and a system for utilizing the card are needed which actively contribute to the security process by securing data entered into the system, rather than merely passively reproducing data which is prerecorded on the card.

SUMMARY OF THE INVENTION

In accordance with the preferred embodiment of the present invention, a card is provided having a plurality of optical ports or apertures formed in the substrate to serve as an optical encryption gate. The optical ports may be randomly disposed at intersections of rows and columns to provide an extremely large population of different cards, each of which can thus be uniquely associated with an individual user.

There is also provided a method of producing the card, and a system which utilizes the card to improve user identification and transaction security. The system comprises an optical reader with light-emitting diode (LED) signal sources, and detectors, a keyboard unit, and a processor or logic unit including circuits for driving the LED signal sources. Input data applied to the card via the logic unit and the signal sources are optically encrypted by the card to improve the security of the system and, hence, user identification in a secured transaction.

The system may also include a physical data collector or transducer for collecting fingerprint or voice-print data or the like from a user and for applying such data in digital form to the card via the logic unit and the card reader.

DESCRIPTION OF THE PREFERRED EMBODIMENT

Figure 1:
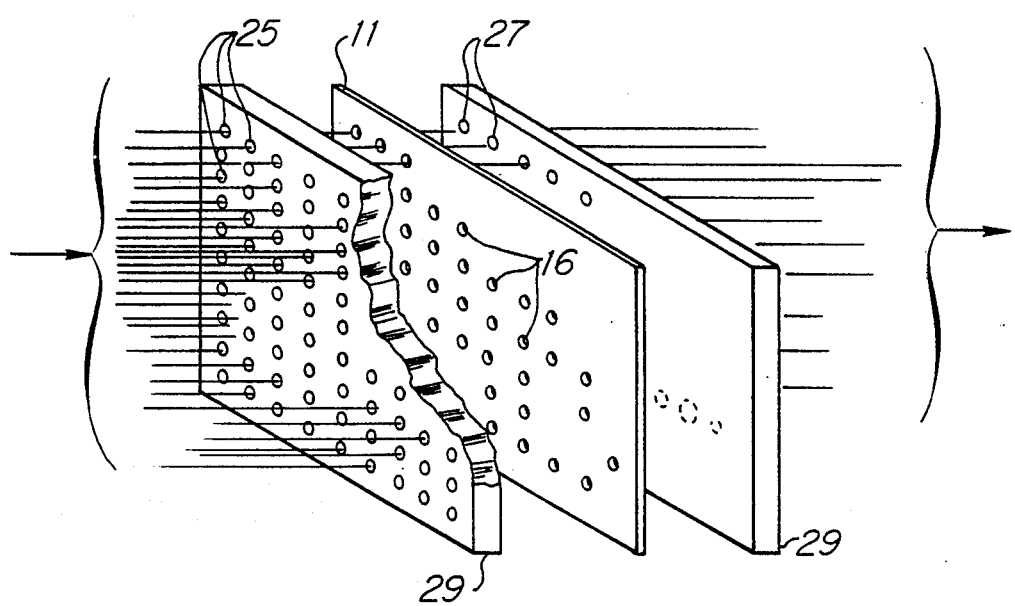
FIG. 1 is a pictorial diagram of a card of the present invention and of a card reader for reading the card.

Referring now to FIG. 1, there is shown a card 11 of the present invention which may be produced by molding an opaque plastic material (such as opaque fiberglass reinforced nylon plastic, or Acrylonitrile Butadiene Styrene plastic, having an index of refraction which minimizes light diffusion therethrough) to form a non-light-conductive substrate. The optical ports 16 may simply be holes formed through the substrate 11 from one major face to the other face, or may be optical ports through the substrate 11 having surface-flush windows covering the ends of the port on both faces. These optical ports 16 are positioned at the intersections of columns and rows over a portion of the area of the card. In one embodiment of the present invention, only one optical port 16 is located along one row. In addition, as shown in the scanning device of FIG. 2, a reference track of optical ports 18 may also be included on the card to provide information about the column in which an optical port 16 appears. A card 11 thus formed does not contain any particular code, but instead is an optical encrypting device which has a random encryption scheme associated therewith. And, in a population of such cards prepared in accordance with the present invention, each card is different and can be uniquely associated with one authorized user. Information such as account balance, etc., may also be recorded on the card by such conventional means as a magnetic stripe 21, embossed characters, or the like.

Figures 2, 3:
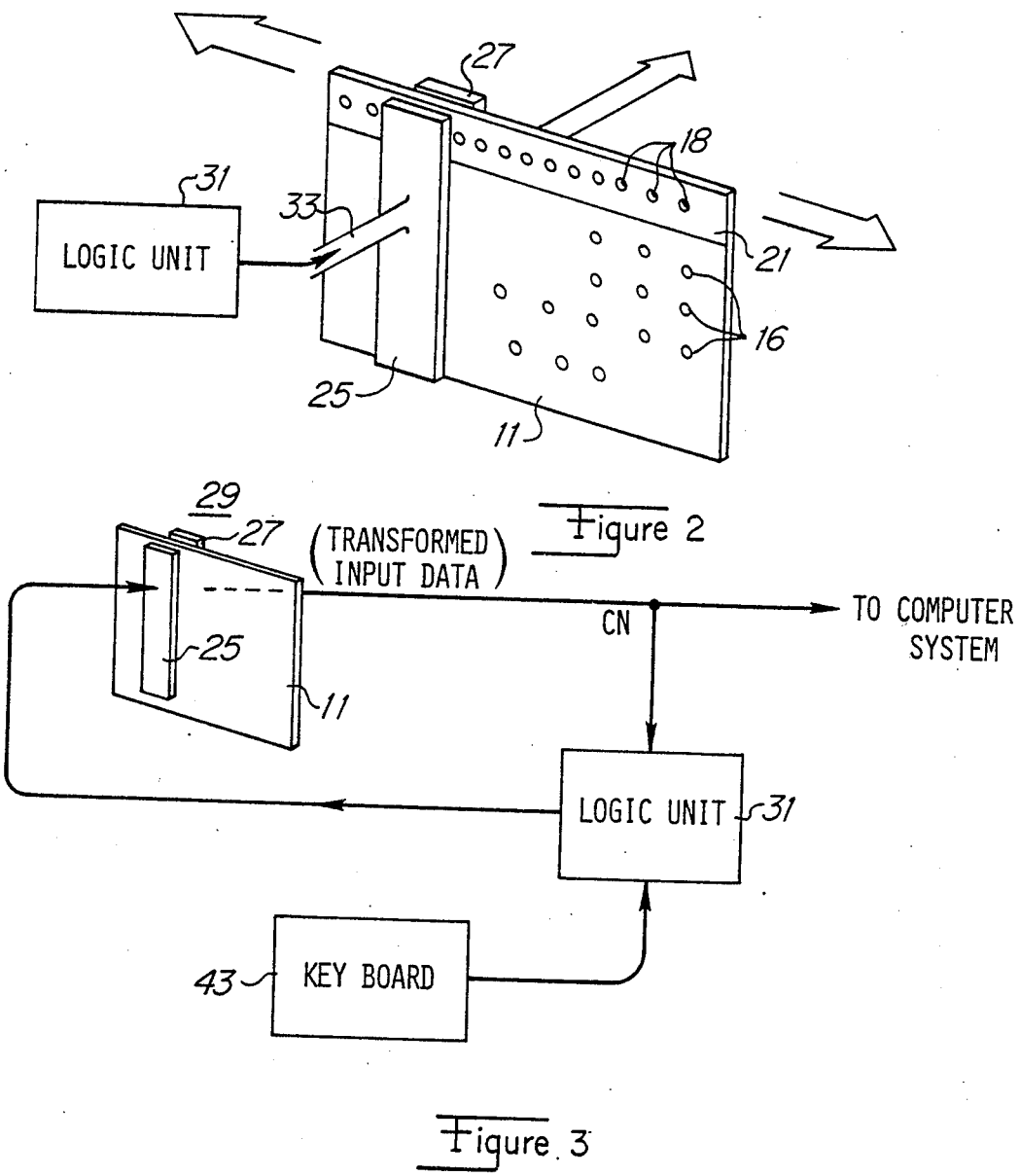
FIG. 2 is a pictorial diagram of the card operating as an optical encoder.
FIG. 3 is a combined pictorial and block diagram of the card and system of the present invention.

In using the card 11 to initiate a transaction (e.g., to communicate a withdrawal or credit transaction to a computer system of a bank), the user first inserts the card 11 into the optical card reader 29 of the system illustrated in FIG. 1 in a manner such that one major face is positioned adjacent the LED light sources 25, and the opposite major face is positioned adjacent the detectors 27. A full matrix of LED sources 25 and a full matrix of detectors 27 may be employed to cover all possible locations of ports 16. Alternatively, the optical ports 16 may be scanned using one or more corresponding sets of aligned light source 25 and detector 27 which move relative to the card 11, or with respect to which the card 11 is moved, as shown in FIG. 2. In the embodiment of FIG. 2, the reference track of optical ports 18 is also scanned to provide information about in which column along a row an optical port 16 is detected.

Data in the form of binary bits from a processor or logic unit 31 are applied via input lines 33 to LED light sources 25, a data bit of "1" causing a respective LED to be turned "on", and a data bit of "0" causing the LED to be turned "off". When card 11 is properly inserted into reader 29 and the LED light sources 25 are energized to "on" and "off" states corresponding to applied data bits as shown in FIG. 2, then the card 11, by virtue of the locations of its optical ports 16, transforms or changes the pattern of the applied data bits detected by detectors 27. Thus, the encoding of applied data by the card itself is determined by the pattern of apertures relative to a reference column (or row) of apertures 18 as the card is moved relative to the reader. The apertures 16, 18 may thus be positioned (within the rows or columns) in a great many different patterns, each providing a distinctive card.

The system illustrated in FIG. 3 operates on the card 11 to secure user-identification data entered into the system by a card holder or user. The system of FIG. 3 comprises a keyboard 43, a card reader 29 for reading a card 11, and a processor or logic unit 31 for storing and processing data entered via the card reader and keyboard, and producing therefrom a secure user-identification code.

In response to card 11 being inserted into reader 29, logic unit 31 produces a card number (CN) identifying the card by applying a fixed, preselected input bit pattern (e.g., an eight-bit pattern of "10101010") to the LEDs 25 at the input port of reader 29. This turns "on" and "off" the LEDs in correspondence with the input bit pattern. The "on" LEDs apply light signals to corresponding (matching) optical ports of the card, either in a full matrix of LEDs and detectors, or in a scanning arrangement using one set of LEDs and detectors which move relative to the card, as described above. This allows the card to transmit or optically gate selected ones of the applied light signals to the detectors 27 which sense the optically gated pattern of light signals to produce a corresponding output bit pattern representing a unique card number (CN) identifying the card 11.

Figure 4:
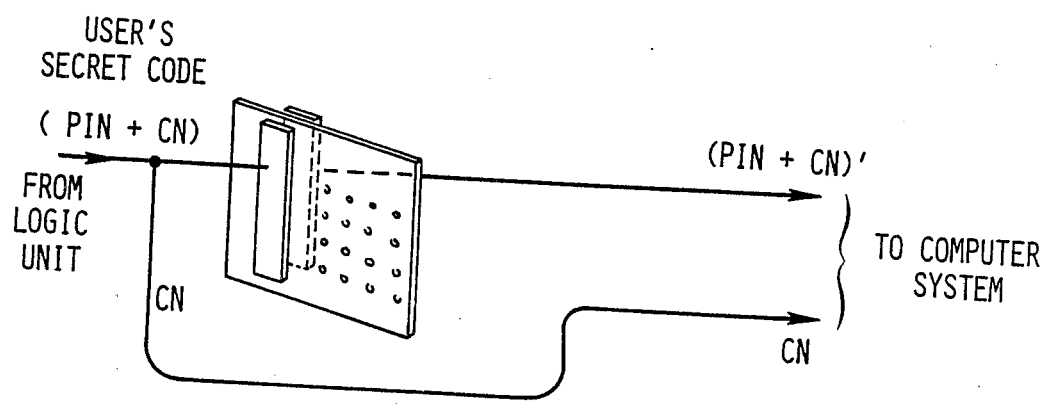
FIG. 4 is a pictorial diagram of the card and card reader of FIG. 1 showing a selected data transformation operation.

In addition to producing a unique card number (CN), the system of FIG. 3 provides for entry of a user's secret code (a code or personal identification number known only to the user or person making the transaction) into the system. After inserting his card 11 into reader 29, the user enters his secret code into the system via keyboard 43. In response to the inserted card, logic unit 31, in conjunction with card 11 and card reader 29, produces a unique card number (CN) as described above, and stores the CN in buffer memory in the logic unit 31. Thereafter, upon entry of the user's secret code (Personal Identification Code, PIN), logic unit 31 applies both the CN and the PIN (sequentially, interdigitally, or in parallel) to card reader 29 and card 11, as shown in FIG. 4. Card 11 transforms the applied data (PIN + CN) to an encrypted form (PIN + CN)' in a manner consistent with the orientation of its optical ports. This transformed or encrypted data (PIN + CN)' is then transferred to a computer system of the institution (e.g., bank) where it is compared with pre-stored data for verifying the correctness of the transformed data (PIN + CN)' and, hence, the correctness of the entered PIN (user's secret code) and of the card (optical port pattern) used.

Figure 5:
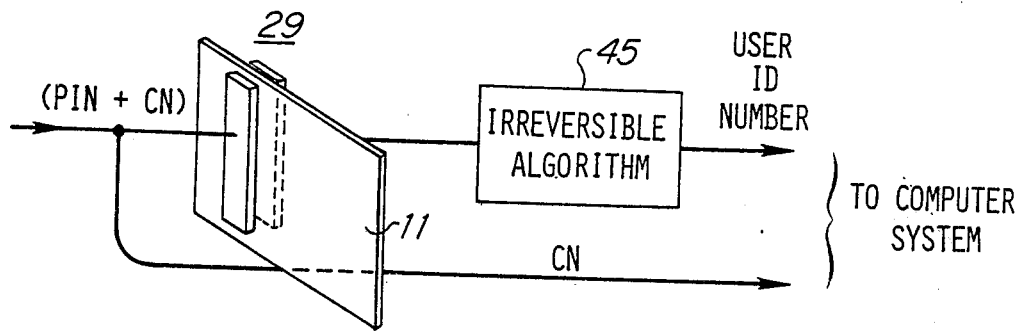
FIG. 5 is a combined pictorial and block diagram of the card and card reader in a system which includes a selected algorithm for performing selected, irreversible data transformation operations.

In FIG. 5, an irreversible algorithm unit 45 (such as the encoding scheme described, for example, in U.S. Pat. No. 3,939,091, entitled "Personal Verification System" issued Feb. 10, 1976, to Martin M. Atalla and Alexander F. Liu, or, for example, the National Bureau of Standards encryption-decryption integrated circuit chip commercially available from Motorola Company) is included in the system for receiving the transformed (PIN + CN)' data and producing therefrom a user ID (identification) number. Irreversible algorithm unit 45, which may represent the institution's own ID or its computer system's ID, increases the security of the system by making the process of producing an ID number from a transformed (PIN + CN)' irreversible (i.e., making it essentially impossible to reproduce the transformed (PIN + CN)' from the ID number, using unit 45). For added security, the transformed (PIN + CN)' may be combined with the generated card number CN or with a user account number or some other identification data, prior to its application to irreversible algorithm unit 45.

Figure 6:
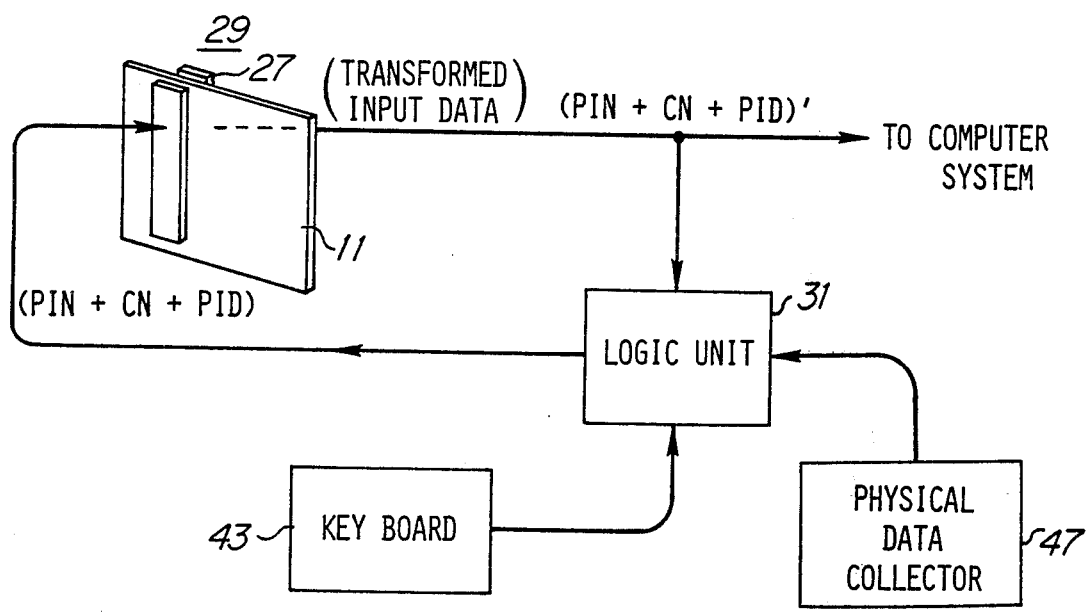
FIG. 6 is a combined pictorial and block diagram of the card and system including a data collector for entering fingerprint or voice-print data.

An alternative embodiment of the system of the present invention is shown in FIG. 6. To provide still greater security of user-identification data entered into the system, and ensure successful use of the system by authorized users only, a physical data collector 47 may be included in the system for receiving physical data from the user, i.e., Physical Identification Data (PID) such as fingerprint, voice-print, signature dynamics information and the like that are unique to the user.

The physical data collector 47 may be a commercially available transducer with optical scanning and detecting capabilities for scanning and detecting a user's fingerprint and converting the fingerprint to digital form for application to card reader 29 and card 11 via logic unit 31. Alternatively, collector 47 may be a commercially available voice-print recorder capable of recording and generating a voice-print of the user's voice and converting the voice-print recording to digital form for application to card reader 29 and card 11 via logic unit 31. Also, the physical data collector 47 may be a conventional signature digitizer or similar conventional transducer which operates on the dynamics of a user signing his name. As shown in FIG. 6, logic unit 31 may combine the CN (card number representing the optical port pattern of the card) and PIN data (the user's secret code described above) with the PID digital data, by applying one or more of the CN, PIN and PID digital data, alone or in combination (sequenttially, interdigitally, or in parallel), to card reader 29 and card 11. Card 11 transforms the applied data (e.g., PIN + CN + PID) to an encrypted form (PIN + CN + PID)' in a manner consistent with the orientation of its optical ports. This transformed or encrypted data (PIN + CN + PID)' is then transferred to the computer system of the institution, where it is compared with pre-stored data verifying the correctness of the transformed PIN', CN' and PID' and, hence, the correctness of the entered PIN in conjunction with the card used, and with the particular user as identified by the PID representing the user's fingerprint or voice-print, or signature, or the like.

Alternatively, the PIN data may be omitted and the applied data for encryption becomes (PID + CN) which is transformed via the card 11 and reader 29. This transformed or encrypted data (PID + CN)' is then transferred to the computer system of the institution, for example, via an irreversible algorithm of the type referred to at 45 in FIG. 5. The transformed data may then be compared with prestored data for verifying the correctness of the transformed data in a manner as previously described.

Thus, from the foregoing description of the optically-ported card and system for utilizing the card, a unique method and means are presented for securing user-identification data.

I claim:

1. A system for securing entered user-identification data utilizing a card having signal ports arranged in a selected pattern for transforming entered data, the system comprising:

card reader means for receiving a card, and responsive to input data for applying input optical signals to selected signal ports in the card and for producing output signals from the card representing input data which is transformed in accordance with the pattern of signal ports in the card;

keyboard means for entering the user-identification data; and logic means coupled to the card reader means for applying a selected input data signal thereto to produce a transformed input data signal representative of the arrangement of signal ports in the card, and to produce an output signal indicative of the logical combination of the transformed input data signal and entered user-identification data transformed in accordance with the pattern of signal ports in the card.

2. The system as in claim 1 including an irreversible algorithm unit for receiving the output signal and producing therefrom irreversible encrypted data.

3. The system as in claim 1 comprising data entry means disposed to collect fingerprint data and apply said data in digital form to the logic means.

4. The system as in claim 1 comprising data entry means including a voice-print recorder disposed for recording voice-print data and applying said data in digital form to the logic means.

5. The system as in claim 1 comprising data entry means including signature transducer means disposed to apply data in digital form concerning user3 s signature to the logic means.

6. A method of securing user-identification data entered into a system utilizing a card having signal ports arranged in a pattern, the method comprising the steps of:

applying a preselected data signal to the card for producing a card number therefrom as the transformed data signal representative of the pattern of signal ports on the card;

producing a personal identification data signal in response to data received from the user; and applying the card number and the personal identification data to the card, and producing therefrom output data including personal identification data and representative card number which are transformed in accordance with the pattern of signal ports in the card.

7. The method of claim 6 wherein the step of producing includes collecting at least one of fingerprint data, voice-print data, and signature data, and converting said data to digital form for logical combination with one of the card number and data received from the user for producing said transformed output data therefrom.

8. The method of claim 6 comprising the additional step of encoding in substantially irreversible manner the transformed data which is produced.

* * * * *